(12) United States Patent
Goldenberg et al.

(10) Patent No.: US 10,530,889 B2
(45) Date of Patent: Jan. 7, 2020

(54) IDENTIFYING MEMBER PROFILES CONTAINING DISALLOWED CONTENT IN AN ONLINE SOCIAL NETWORK

(71) Applicant: Microsoft Technology Licensing, LLC, Redmond, WA (US)

(72) Inventors: Yaniv Goldenberg, Mountain View, CA (US); Theodore H. Hwa, Cupertino, CA (US); Michael F. Shoukry, Morgantown, WV (US); Matthew David Shoup, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 382 days.

(21) Appl. No.: 14/174,524

(22) Filed: Feb. 6, 2014

(65) Prior Publication Data
US 2015/0220646 A1 Aug. 6, 2015

(51) Int. Cl.
| | | |
|---|---|---|
| *G06F 7/00* | (2006.01) | |
| *H04L 29/08* | (2006.01) | |
| *G06F 16/958* | (2019.01) | |

(52) U.S. Cl.
CPC .......... *H04L 67/306* (2013.01); *G06F 16/958* (2019.01)

(58) Field of Classification Search
CPC .................................................... G06F 16/958
USPC .......................................................... 707/734
See application file for complete search history.

(56) References Cited

U.S. PATENT DOCUMENTS

| | | | | |
|---|---|---|---|---|
| 5,796,948 A | * | 8/1998 | Cohen .................. | G06Q 10/107 709/202 |
| 6,363,383 B1 | * | 3/2002 | Kindo ..................... | G06F 21/62 |
| 8,484,744 B1 | * | 7/2013 | De ....................... | G06F 21/6245 726/26 |
| 8,897,484 B1 | * | 11/2014 | Fredinburg ...... | G11B 20/00855 382/100 |
| 9,225,701 B2 | * | 12/2015 | Gongaware ............. | H04L 63/08 |
| 9,449,091 B1 | * | 9/2016 | Rao ..................... | G06Q 30/0271 |
| 9,503,456 B1 | * | 11/2016 | Lindberg .............. | H04L 65/403 |
| 10,237,225 B1 | * | 3/2019 | Ande ....................... | H04L 51/32 |
| 2003/0207237 A1 | * | 11/2003 | Glezerman ............. | G09B 5/06 434/118 |
| 2007/0256033 A1 | * | 11/2007 | Hiler ..................... | G06Q 10/10 715/860 |
| 2010/0250573 A1 | * | 9/2010 | Mayer .................... | G06Q 30/02 707/759 |

(Continued)

*Primary Examiner* — Eliyah S. Harper
(74) *Attorney, Agent, or Firm* — Schwegman Lundberg & Woessner, P.A.

(57) ABSTRACT

The disclosed embodiments relate to a system for identifying member profiles containing disallowed content in an online social network. During operation, the system scans member profiles looking up words from one or more fields in "bad-word" and/or "good-word" dictionaries. These dictionaries were previously generated by examining member profiles that were judged by a human reviewer to be "good" profiles or "bad" profiles, and determining whether a word belongs in a specific dictionary based on frequencies of occurrence of the word in the good profiles and the bad profiles. Next, the system computes a score for each member profile based at least partially on occurrences of words from the dictionaries in the member profile. Finally, the system identifies a member profile as containing disallowed content based on the score.

21 Claims, 7 Drawing Sheets

(56) References Cited

U.S. PATENT DOCUMENTS

| | | | |
|---|---|---|---|
| 2010/0268682 A1* | 10/2010 | Lewis | G06Q 10/107 706/54 |
| 2012/0190386 A1* | 7/2012 | Anderson | G01C 15/04 455/456.3 |
| 2013/0018824 A1* | 1/2013 | Ghani | G06N 99/005 706/12 |
| 2015/0070516 A1* | 3/2015 | Shoemake | H04N 21/42203 348/207.11 |
| 2018/0122256 A1* | 5/2018 | Smith | G09B 7/00 |
| 2019/0073592 A1* | 3/2019 | Luo | G06N 3/0454 |

* cited by examiner

| | |
|---|---|
| fl_bad_words1 | *-3.7342+ |
| fl_bad_words2 | *-4.6315+ |
| fl_bad_words3 | *-3.4997+ |
| fl_good_words | * 1.5019+ |
| prof_bad_words1 | * -4.814+ |
| prof_bad_words2 | *-5.0484+ |
| prof_good_words | * 0.2615+ |
| pos_bad_words1 | *-0.3101+ |
| pos_bad_words2 | *-0.4749+ |
| pos_bad_words3 | *-1.4675+ |
| pos_good_words | * 0.0906+ |

FIG. 5B

IDENTIFYING MEMBER PROFILES CONTAINING DISALLOWED CONTENT IN AN ONLINE SOCIAL NETWORK

RELATED ART

The disclosed embodiments generally relate to online social networks. More specifically, the disclosed embodiments relate to techniques for efficiently identifying member profiles containing disallowed content, such as obscenity or pornography, in an online social network.

BACKGROUND

Perhaps the most significant development on the Internet in recent years has been the rapid proliferation of online social networks, such as LinkedIn™ and Facebook™. Billions of users are presently accessing such social networks to connect with friends and acquaintances and to share personal and professional information. As these online social networks become increasingly popular, some enterprising individuals are beginning to exploit these online social networks for financial gain by populating member records with disallowed content, such as pornographic images, to attract customers to websites selling pornography, sexual services, drugs or counterfeit goods.

This disallowed content is offensive to many users of online social networks, and these users often become upset when such content appears while they browse the online social network. Also, some users of these online social networks are children, who should be protected from this type of content.

Hence, what is needed is a mechanism for efficiently filtering out disallowed content from online social networks.

BRIEF DESCRIPTION OF THE FIGURES

FIG. 5B illustrates a representative set of coefficients in accordance with the disclosed embodiments.

DESCRIPTION

Figure 1:
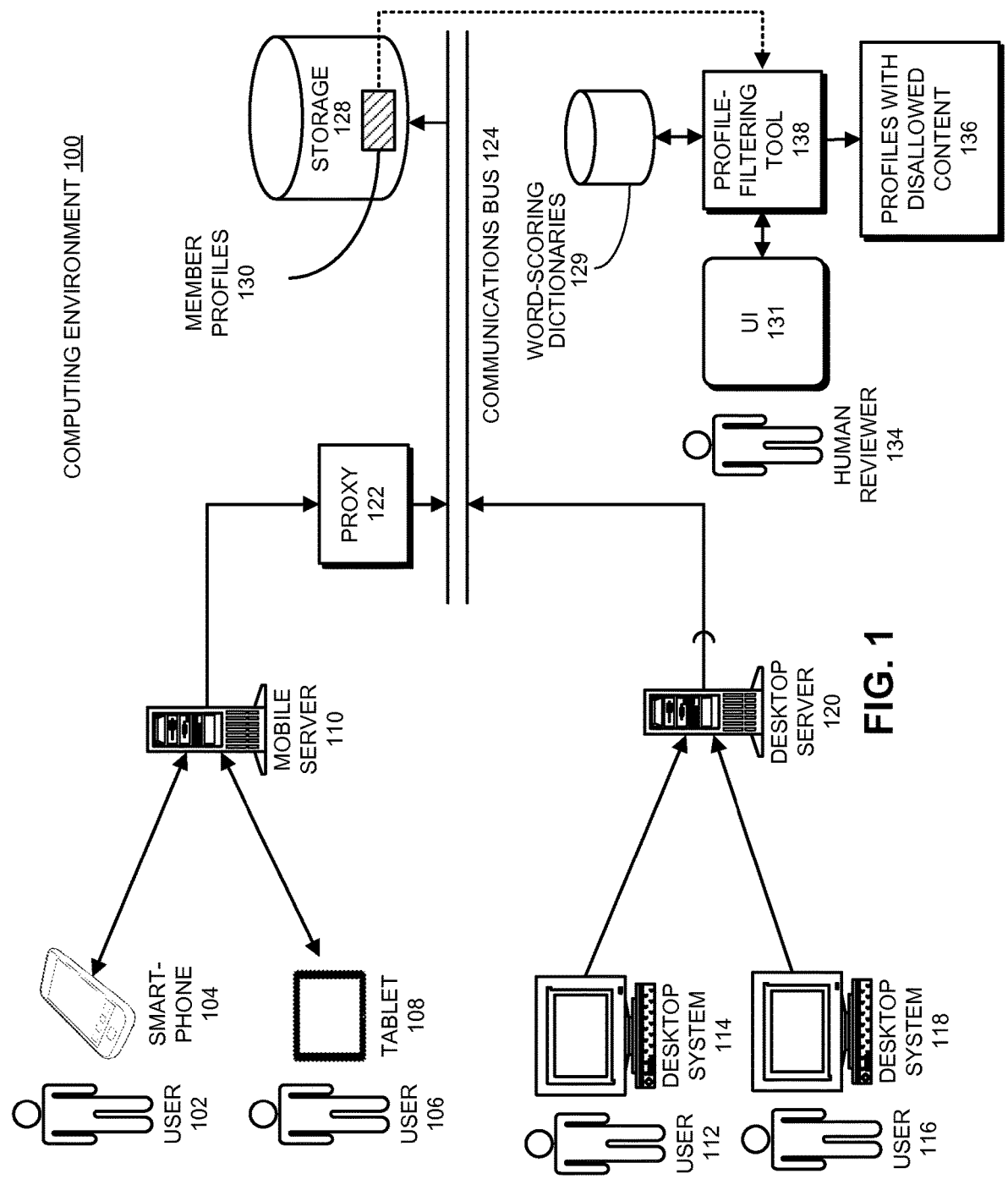
FIG. 1 illustrates a computing environment for an online social network in accordance with the disclosed embodiments.

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a system reads and executes the code and/or data stored on the non-transitory computer-readable storage medium, the system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments relate to a system for identifying member profiles containing disallowed content in an online social network. During operation, the system scans member profiles looking up words from one or more fields in "bad-word" and/or "good-word" dictionaries. These dictionaries were previously generated by examining member profiles that were judged by a human reviewer to be "good" profiles or "bad" profiles, and determining whether a word belongs in a specific dictionary based on frequencies of occurrence of the word in the good profiles and the bad profiles. Next, the system computes a score for each member profile based at least partially on occurrences of words from the dictionaries in the member profile. Finally, the system identifies a member profile as containing disallowed content based on the score.

Next, the system performs a verification operation involving a human reviewer on the identified member profiles. During this verification operation, the system presents member profiles that were identified as containing disallowed content to the human reviewer, wherein each identified profile is presented to the human reviewer along with an image and associated text from the member profile, wherein multiple member profiles are presented to the human reviewer in a single view through a user interface (UI). Next, the system allows the human reviewer to select and/or deselect a member profile through the UI, wherein a selection of a member profile verifies that the member profile contains disallowed content.

Before describing details about how the system analyzes member profiles, we first describe a computing environment in which the system operates.

Computing Environment

FIG. 1 illustrates an exemplary computing environment 100 that supports an online social network in accordance with the disclosed embodiments. The system illustrated in FIG. 1 allows users to interact with the online social network from mobile devices, including a smartphone 104 and a tablet computer 108. The system also enables users to interact with the online social network through desktop systems 114 and 118 that access a website associated with the online application.

More specifically, mobile devices 104 and 108, which are operated by users 102 and 106 respectively, can execute mobile applications that function as portals to an online application, which is hosted on mobile server 110. Note that a mobile device can generally include any type of portable electronic device that can host a mobile application, including a smartphone, a tablet computer, a network-connected music player, a gaming console and possibly a laptop computer system.

Mobile devices 104 and 108 communicate with mobile server 110 through one or more networks (not shown), such as a WiFi® network, a Bluetooth™ network or a cellular data network. Mobile server 110 in turn interacts through proxy 122 and communications bus 124 with a storage system 128. These interactions allow users to generate and update member profiles 130, which are stored in storage system 128. Although the illustrated embodiment shows only two mobile devices, in general a large number of mobile devices and associated mobile application instances (possibly thousands or millions) can simultaneously access the online application.

Member profiles 130 include various types of information about each member. For example, if the online social network is an online professional network, such as LinkedIn™, a member profile can include: first and last name fields containing a first name and a last name for a member; a headline field specifying a job title and a company associated with the member; and one or more position fields specifying prior positions held by the member.

The disclosed embodiments also allow users to interact with the online social network through desktop systems. For example, desktop systems 114 and 118, which are operated by users 112 and 116, respectively, can interact with a desktop server 120, and desktop server 120 can interact with storage system 128 through communications bus 124.

Note that communications bus 124, proxy 122 and storage device 128 can be located on one or more servers distributed across a network. Also, mobile server 110, desktop server 120, proxy 122, communications bus 124 and storage device 128 can be hosted in a virtualized cloud-computing system.

During operation of the system illustrated in FIG. 1, a profile-filtering tool 138 analyzes member profiles to identify member profiles containing disallowed content 136. During this process, profile-filtering tool 138 creates and uses various word-scoring dictionaries 129, and also receives input from a human reviewer 134 through a UI 131. This process is described in more detail below.

System for Analyzing Member Profiles

Figure 2:
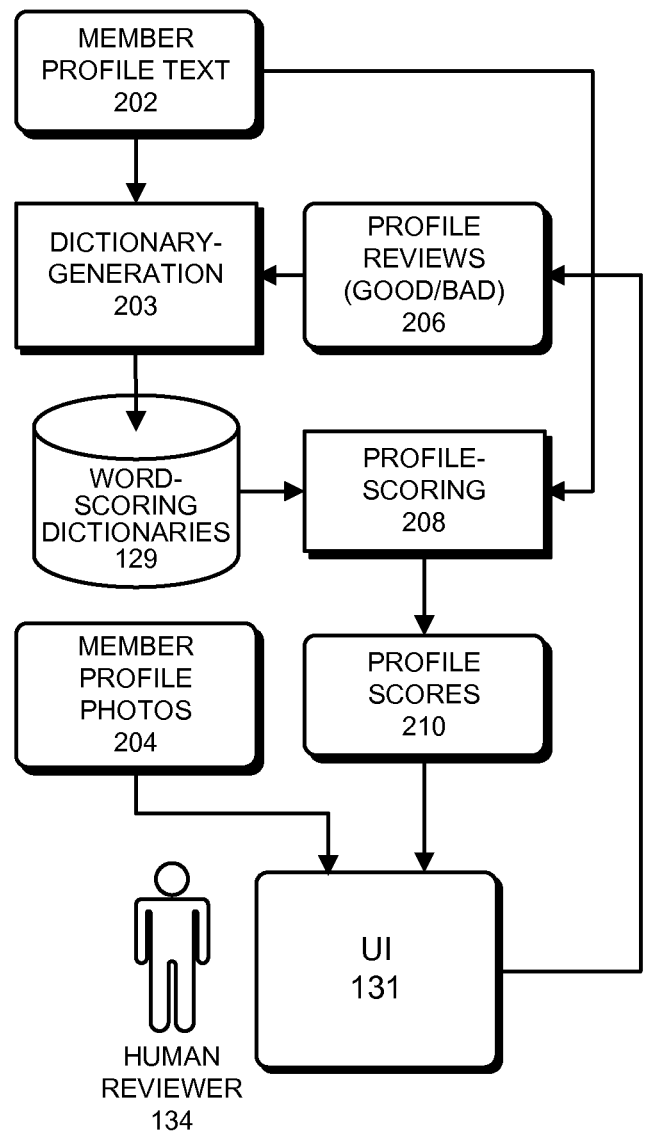
FIG. 2 presents a block diagram illustrating how member profiles are analyzed in accordance with the disclosed embodiments.

FIG. 2 presents a block diagram illustrating how member profiles are analyzed in accordance with the disclosed embodiments. During operation, the system receives member profiles 130 (from FIG. 1) as an input, wherein these member profiles are divided into member profile text 202 and member profile photos 204. In some embodiments, these two types of data are stored on separate servers. For example, member profile text 202 can be stored in a data storage system such as Hadoop™, and member profile photos 204 can be stored on a separate media server.

During the analysis process, a dictionary-generation module 203 receives the member profile text 202 and profile reviews 206 as inputs, and uses these inputs to produce one or more word-scoring dictionaries 129 as is described in more detail below. Note that word-scoring dictionaries 129 can include both bad-word and good-word dictionaries, wherein a bad-word dictionary contains "bad words," which are correlated with bad profiles containing disallowed content, and a good-word dictionary contains "good words," which are correlated with good profiles that do not contain disallowed content.

Disallowed content can generally include any type of content that violates a terms of service agreement for members of the online social network. For example, the disallowed content can include: profanity, pornography, copyright violations, trademark violations, solicitations for sexual services, advertisements for drugs, and advertisements for counterfeit goods.

After the word-scoring dictionaries 129 are created, a profile-scoring module 208 uses the word-scoring dictionaries 129 (along with associated dictionary-specific coefficients) to generate profile scores 210. These profile scores 210 are used to identify a set of profiles containing disallowed content.

Next, the identified profiles are presented through a UI 131 to a human reviewer 134 along with an image and associated text from the member profile. Note that multiple member profiles can be presented to the human reviewer in a single view through a user interface (UI). This allows the human reviewer to select and/or deselect each member profile through UI 131, wherein a selection of a member profile by the human reviewer verifies that the member profile contains disallowed content.

Detailed Analysis Process

Figure 3:
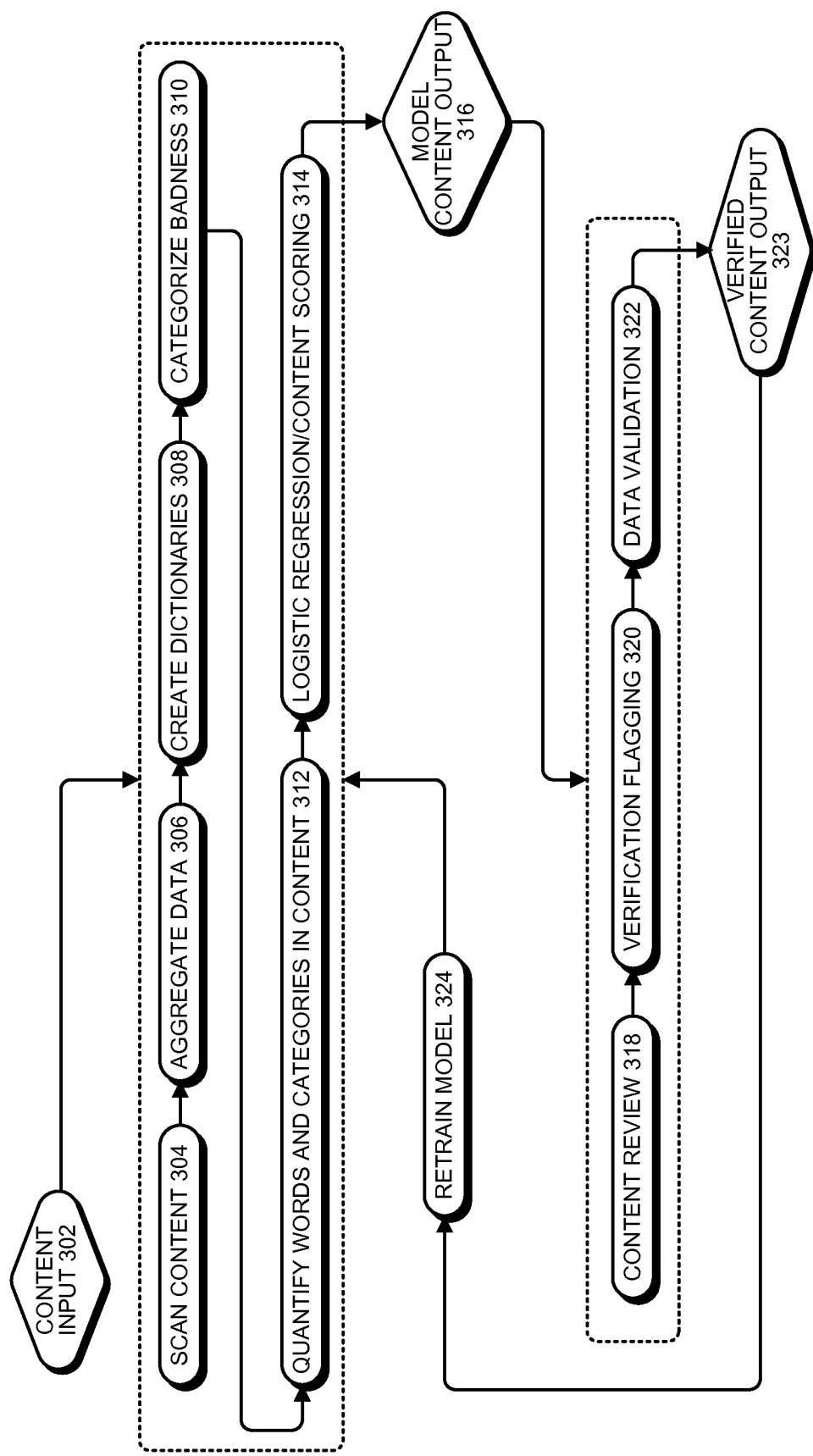
FIG. 3 presents an operation diagram illustrating how member profiles are analyzed in accordance with the disclosed embodiments.

FIG. 3 presents an operation diagram illustrating how member profiles are analyzed in accordance with the disclosed embodiments. At the start of the process, the system receives content input 302, which includes the member profiles. The system scans the content 304 and aggregates the data 306, which includes breaking the text into words. (This can involve "tokenizing" the words, so that the words are represented by a codeword or hash.) The system then creates the word-scoring dictionaries 308 as is described in more detail below.

Next, the system performs a number of operations, including categorizing the badness 310 of the words and profiles, quantifying the words and categories in the content 312, and performing a logistic-regression operation based on content scoring 314 to produce model content output 316. These operations involve using the set of profiles as a training data set for a logistic-regression operation, which optimizes parameters for a dictionary-based scoring function to score the profiles in a way that differentiates profiles containing disallowed content from the other profiles. These operations are described in more detail below.

Next, the system performs a number of operations to enable a human reviewer to verify profiles that are identified as containing disallowed content. These operations include a content-review operation 318, a verification/flagging operation 320, and a data-validation operation 322 that produces verified content output 323. These operations present profiles that have been identified as containing disallowed content to a human reviewer along with a profile photograph, and then allow the human reviewer to verify whether the profiles contain disallowed content. The verified content output 323 can then be used as additional inputs to retrain the model 324 to recognize the disallowed content.

Categorizing Words

Figure 4:
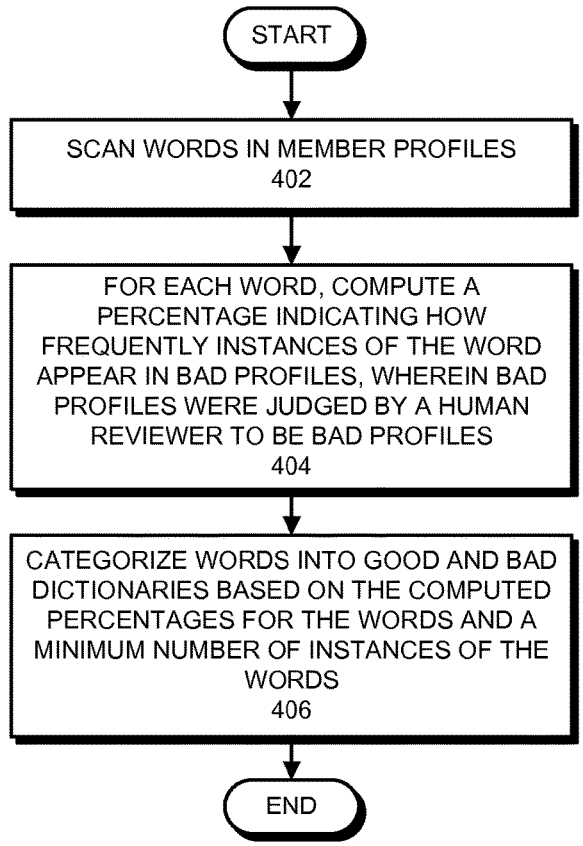
FIG. 4 presents a flow chart illustrating how words are categorized into dictionaries in accordance with the disclosed embodiments.

FIG. 4 presents a flow chart illustrating how words are categorized into dictionaries in accordance with the disclosed embodiments. During this process, the system scans words in one or more fields in the member profiles (step 402). In some embodiments, the system generates a set of field-specific dictionaries for each field in the member profiles. This is useful because words can be bad or good in certain fields and not in others. For example, in an online professional network such as LinkedIn™, "John Hooker" can be a valid name, so the word "Hooker" appearing in a last name field is valid. However, the word "Hooker" appearing in a user's headline field is not likely to be valid. Also, a drug name appearing in a name field is not likely to be valid. In contrast, the word "Engineer" appearing in a member's headline field is a "good" word, which indicates that the associated profile is likely to be valid.

Next, for each word, the system computes a percentage indicating how frequently the word appears in bad profiles, wherein bad profiles were judged by a human reviewer to be bad profiles (step 404). Next, the system categorizes words into good and bad dictionaries based on the computed percentages for the words and also a minimum number of instances for the word (step 406). For example, the system can place words into three bad dictionaries and one good dictionary based on the following rules:

1. Bad1 dictionary (lesser evil)—at least 5 instances and 10-25% of instances occur in bad profiles;
2. Bad2 dictionary (great evil)—at least 5 instances and 25-40% of instances occur in bad profiles;
3. Bad3 dictionary (diabolical)—at least 5 instances and more than 40% of instances occur in bad profiles; and
4. Good dictionary (good)—at least 300 instances and less than 1% of instances occur in bad profiles.

Determining Coefficients Through Logistic Regression

Figure 5A:
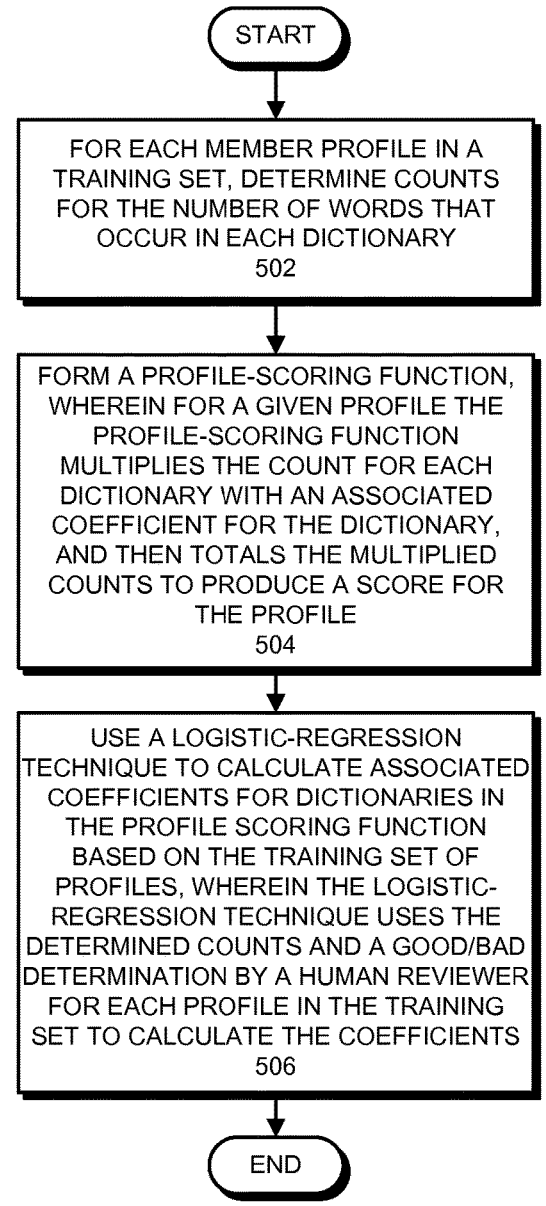
FIG. 5A presents a flow chart illustrating how logistic regression is used to determine coefficients for dictionaries in accordance with the disclosed embodiments.

FIG. 5A presents a flow chart illustrating how a logistic-regression technique can be used to determine coefficients for dictionaries in accordance with the disclosed embodiments. First, for each member profile in a "training set" of member profiles, the system looks up words from the profiles in the good-word and bad-word dictionaries to determine counts for the number of words that occur in each dictionary (step 502). Next, the system forms a profile-scoring function, wherein for a given profile, the profile-scoring function multiplies the count for each dictionary associated with an associated coefficient for each dictionary and then totals the multiplied counts to produce a score for the profile (step 504). Next, the system uses a logistic-regression technique to calculate associated coefficients for the dictionaries in the profile-scoring function based on the training set of profiles (step 506). During this process, the logistic-regression technique uses the determined counts for each profile and a good/bad determination by a human for each profile in the training set to calculate the coefficients.

For example, using the four dictionaries listed above, the profile-scoring function might look like the following:

Profile Score = (# words in $Bad1$) ∗ ($coeff$ for $Bad1$) +

(# words in $Bad2$) ∗ ($coeff$ for $Bad2$) +

(# words in $Bad3$) ∗ ($coeff$ for $Bad3$) +

(# words in $Good$) ∗ ($coeff$ for $Good$).

The system considers each profile in the training set to be a four-dimensional vector having integer values for each of the four dictionaries along with a good/bad determination for the profile. These vectors and the profile-scoring function are used by a logistic-regression technique to determine a set of coefficients that enables the profile-scoring function to select profiles that are likely to include disallowed content. Note that logistic regression is a type of probabilistic classification model that is used to predict a binary response (e.g., a good or bad profile) based on one or more features (e.g., counts for each dictionary).

For example, in the case of an online professional network such as LinkedIn™, the system can maintain good and bad dictionaries for (1) first and last names (represented by "fl_"), (2) profile headlines (represented by "prof_"), and (3) positions (represented by "pos_"). In this example, the coefficients may look like the coefficients that appear in FIG. 5B, wherein there are: 3 bad-word dictionaries and one good-word dictionary for first and last names; 2 bad-word dictionaries and one good-word dictionary for profile headlines; and 3 bad-word dictionaries and one good-word dictionary for positions.

Analyzing Member Profiles

Figure 6:
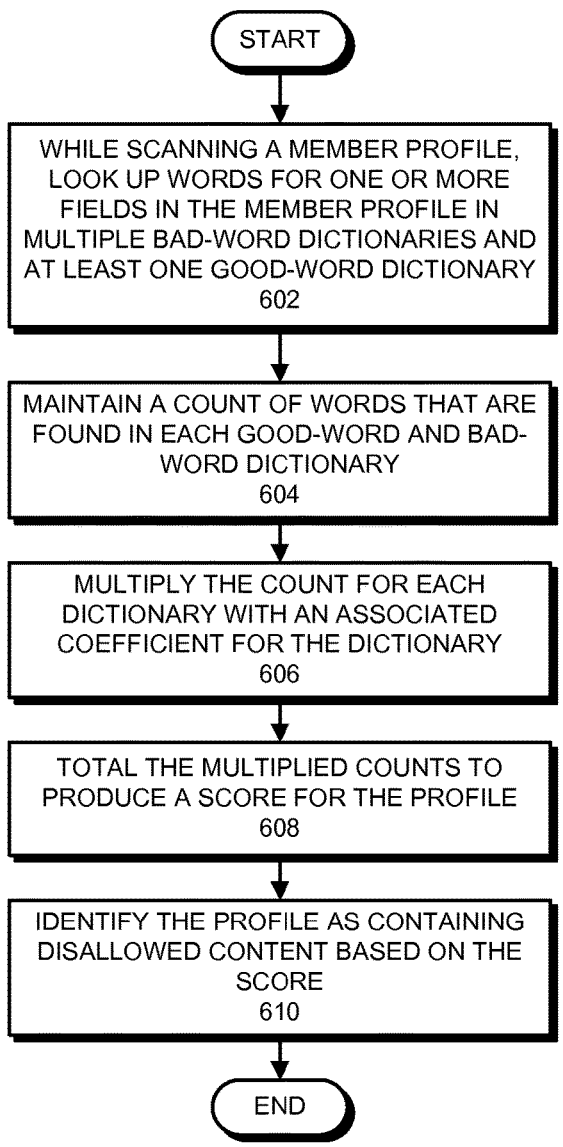
FIG. 6 presents a flow chart illustrating how member profiles are analyzed in accordance with the disclosed embodiments.

FIG. 6 presents a flow chart illustrating how member profiles can be analyzed in accordance with the disclosed embodiments. First, the system scans member profiles in the online social network looking up words from one or more fields in the member profiles in multiple bad-word dictionaries and at least one good-word dictionary (step 602). Next, the system computes a score for each member profile by maintaining a count of words in the member profile that are found in each bad-word dictionary and good-word dictionary (step 604). The system then multiplies the count for each dictionary with an associated coefficient for the dictionary (step 606). Next, the system totals the multiplied counts to produce the score (step 608). Finally, the system identifies a member profile as containing disallowed content based on the score (step 610). For example, the system can identify a member profile as containing disallowed content if the score for the profile exceeds a threshold value, or if the score for the profile is among the N highest scores in the set of member profiles.

Human Verification

Figure 7:
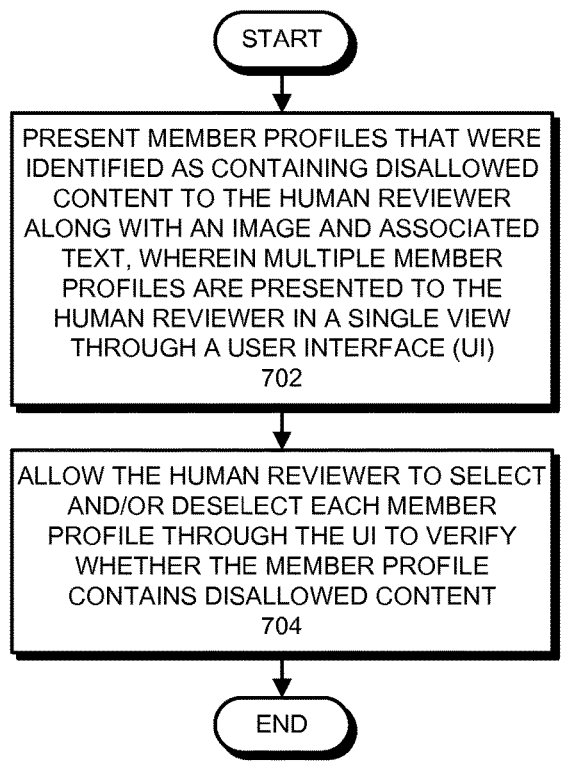
FIG. 7 presents a flow chart illustrating how a human reviewer is used to verify profiles in accordance with the disclosed embodiments.

FIG. 7 presents a flow chart illustrating how a human reviewer can be used to verify profiles in accordance with the disclosed embodiments. During this review process, the system presents member profiles that were identified as containing disallowed content based on the dictionaries to the human reviewer. Each identified member profile is presented to the human reviewer along with an image and associated text from the member profile, and multiple member profiles are presented to the human reviewer in a single view through a user interface (UI) (step 702). Next, the system allows the human reviewer to select and/or deselect each member profile through the UI, wherein a selection of a member profile by the human reviewer verifies that the member profile contains disallowed content (step 704).

Figure 8:
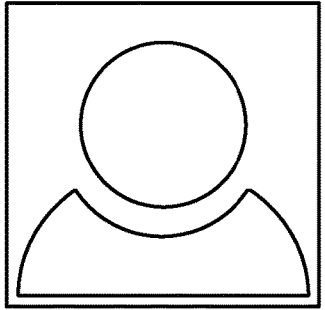
FIG. 8 illustrates an exemplary UI for verifying member profiles in accordance with the disclosed embodiments.

For example, FIG. 8 illustrates an exemplary UI 131 for verifying member profiles in accordance with the disclosed embodiments. Note that UI 131 presents multiple member profiles to a human reviewer, wherein each profile includes an image from the associated member profile and some additional text. For example, as illustrated in FIG. 8, for each member profile in an online professional network, the system presents: (1) a numerical identifier for the member, (2) first and last names for the member, (3) a current position held by the member, (4) an organization that the member works with, and finally (5) an image from the member's profile. UI 131 also includes a checkbox for each profile along with a select all button 802 and an unselect all button 804 to enable the human reviewer to select profiles containing disallowed content. After all of the relevant profiles are selected by the human reviewer, UI 131 provides a submit button 806, which enables the human reviewer to "submit" the selections, which validates the fact that the profile contains disallowed content.

Human reviewers tend to be very good at recognizing images in the profiles. For example, a human reviewer can easily determine whether an image contains pornography. Also, the human reviewer can scan a large number of images in a small amount of time. Hence, if UI 131 presents 40 profiles with images in one view, the human reviewer will be able to select the bad images in a short amount of time. Thus, this visual review of profile images facilitates rapid review of profiles by a human reviewer.

Extensions

The above-described system can be extended in a number of ways. For example, the system is not limited to English and can be used to detect disallowed content in foreign languages. In this case, the dictionaries need to be extended to include non-English words.

The system can also be extended to look at other types of data to determine whether the associated profile contains disallowed content. For example, the system can examine an IP address that a member used to access the online social network to determine whether the IP address is associated with other members whose records contain disallowed content. The system can also examine the email address in a member record to determine whether the email address originates from a domain that is associated with member records containing disallowed content. The system can also examine the text of email addresses to look for bad words. (A good profile will generally not contain an email address that includes a bad word.)

In additional to examining individual words, the system can examine N-grams comprising two or more adjacent words to see if specific N-grams are correlated with profiles containing disallowed content.

The system can also be extended to look for different categories of badness. For example, words associated with pornography belong to a different category of badness than words associated with counterfeit goods. Hence, the system can include words belonging to different categories of badness in the dictionaries.

In an online professional network, the system can possibly count the number of "start dates" for jobs in the member records and can determine from the number of start dates whether the associated profile is likely to contain disallowed content. For example, if the number of start dates in a member record is zero or is extremely large, say over 10, the member record is likely to contain disallowed content.

The foregoing descriptions of disclosed embodiments have been presented only for purposes of illustration and description. They are not intended to be exhaustive or to limit the disclosed embodiments to the forms disclosed. Accordingly, many modifications and variations will be apparent to practitioners skilled in the art. Additionally, the above disclosure is not intended to limit the disclosed embodiments. The scope of the disclosed embodiments is defined by the appended claims.

What is claimed is:

1. A computer-implemented method for identifying member profiles containing disallowed content in an online social network, the method comprising:
    scanning member profiles in the online social network, wherein each member profile includes a plurality of fields;
    while scanning the member profiles, for each profile, looking up words from each of one or more fields in:
        a set of multiple first dictionaries containing words that are correlated with disallowed profiles, and
        at least one second dictionary containing words that are correlated with allowed profiles;
    wherein the multiple first dictionaries are associated with different levels of disallowedness and contain words having differing frequencies of occurrence in the disallowed profiles; and
    wherein each field in the plurality of fields is associated with a different set of multiple first dictionaries and a second dictionary;
    computing a score for each member profile by:
        determining counts of words in the member profile that are found in each of the multiple first dictionaries and the second dictionary associated with each field in the plurality of fields;
        multiplying the count for each dictionary with an associated coefficient for the dictionary; and
        totaling the multiplied counts for the plurality of fields to produce the score;
    identifying one or more member profiles, wherein the member profile score of each identified member profile is above a threshold and/or among a highest N member profile scores (N>0); and
    presenting the identified member profiles to a reviewer, wherein the reviewer verifies, for each identified member profile, whether the member profile contains disallowed content.

2. The computer-implemented method of claim 1, wherein the presenting comprises:
    displaying for the reviewer through an interface, for each identified member profile, an image and associated text from the member profile; and
    allowing the reviewer to select and/or deselect each identified member profile through the interface, wherein a selection of a member profile by the reviewer verifies that the member profile contains disallowed content.

3. The computer-implemented method of claim 1, wherein the associated coefficient for each dictionary is computed using a logistic-regression technique that examines words in a training set comprising member profiles that have been determined to be allowed profiles or disallowed profiles.

4. The computer-implemented method of claim 1, wherein:
    the online social network comprises an online professional network; and
    the one or more fields in each member profile containing words that are looked up include:
        first and last name fields containing a first name and a last name for the member;
        a headline field specifying a job title and a company for the member; and
        one or more position fields specifying prior positions held by the member.

5. The computer-implemented method of claim 1, wherein the disallowed member profiles contain one or more of the following:
- profanity;
- pornography;
- copyright violations;
- trademark violations;
- solicitations for sexual services;
- advertisements for drugs; and
- advertisements for counterfeit goods.

6. A non-transitory computer-readable storage medium storing instructions that, when executed by a computer, cause the computer to perform a method for identifying member profiles containing disallowed content in an online social network, the method comprising:
- scanning member profiles in the online social network, wherein each member profile includes a plurality of fields;
- while scanning the member profiles, for each profile, looking up words from each of one or more fields in:
  - a set of multiple first dictionaries containing words that are correlated with disallowed profiles, and
  - at least one second dictionary containing words that are correlated with allowed profiles;
- wherein the multiple first dictionaries are associated with different levels of disallowedness and contain words having differing frequencies of occurrence in the disallowed profiles; and
- wherein each field in the plurality of fields is associated with a different set of multiple first dictionaries and a second dictionary;
- computing a score for each member profile by:
  - determining counts of words in the member profile that are found in each of the multiple first dictionaries and the second dictionary associated with each field in the plurality of fields;
  - multiplying the count for each dictionary with an associated coefficient for the dictionary; and
  - totaling the multiplied counts for the plurality of fields to produce the score;
- identifying one or more member profiles, wherein the member profile score of each identified member profile is above a threshold and/or among a highest N member profile scores (N>0); and
- presenting the identified member profiles to a reviewer, wherein the reviewer verifies, for each identified member profile, whether the member profile contains disallowed content.

7. The non-transitory computer-readable storage medium of claim 6, wherein the presenting comprises:
- displaying for the reviewing through an interface, for each identified member profile, an image and associated text from the member profile; and
- allowing the reviewer to select and/or deselect each identified member profile through the interface, wherein a selection of a member profile by the reviewer verifies that the member profile contains disallowed content.

8. The non-transitory computer-readable storage medium of claim 6, wherein the associated coefficient for each dictionary is computed using a logistic-regression technique that examines words in a training set comprising member profiles that have been determined to be allowed profiles or disallowed profiles.

9. The non-transitory computer-readable storage medium of claim 6, wherein:

the online social network comprises an online professional network; and
the one or more fields in each member profile containing words that are looked up include:
- first and last name fields containing a first name and a last name for the member;
- a headline field specifying a job title and a company for the member; and
- one or more position fields specifying prior positions held by the member.

10. The non-transitory computer-readable storage medium of claim 6, wherein the disallowed member profiles contain one or more of the following:
- profanity;
- pornography;
- copyright violations;
- trademark violations;
- solicitations for sexual services;
- advertisements for drugs; and
- advertisements for counterfeit goods.

11. A system that identifies member profiles containing disallowed content in an online social network, the system comprising:
- a computing system comprising a processor and a memory;
- wherein the computing system is configured to:
  - scan member profiles in the online social network, wherein each member profile includes a plurality of fields;
  - while scanning the member profiles, for each profile, look up words from each of one or more fields in:
    - a set of multiple first dictionaries containing words that are correlated with disallowed profiles, and
    - at least one second dictionary containing words that are correlated with allowed profiles;
  - wherein the multiple first dictionaries are associated with different levels of disallowedness and contain words having differing frequencies of occurrence in the disallowed profiles; and
  - wherein each field in the plurality of fields is associated with a different set of multiple first dictionaries and a second dictionary;
  - compute a score for each member profile by:
    - determining counts of words in the member profile that are found in each of the multiple first dictionaries and the second dictionary associated with each field in the plurality of fields;
    - multiplying the count for each dictionary with an associated coefficient for the dictionary; and
    - totaling the multiplied counts for the plurality of fields to produce the score; and
  - identify one or more member profiles, wherein the member profile score of each identified member profile is above a threshold and/or among a highest N member profile scores (N>0); and
  - present the identified member profiles to a reviewer, wherein the reviewer verifies, for each identified member profile, whether the member profile contains disallowed content.

12. The system of claim 11, wherein the presenting comprises:
- displaying for the reviewer through an interface, for each identified member profile, an image and associated text from the member profile; and
- allowing the reviewer to select and/or deselect each identified member profile through the interface, wherein a selection of a member profile by the reviewer verifies that the member profile contains disallowed content.

13. The system of claim 11, wherein the associated coefficient for each dictionary is computed using a logistic-regression technique that examines words in a training set comprising member profiles that have been determined to be allowed profiles or disallowed profiles.

14. The system of claim 11, wherein:
   the online social network comprises an online professional network; and
   the one or more fields in each member profile containing words that are looked up includes:
      first and last name fields containing a first name and a last name for the member;
      a headline field specifying a job title and a company for the member; and
      one or more position fields specifying prior positions held by the member.

15. The system of claim 11, wherein the disallowed member profiles contain one or more of the following:
   profanity;
   pornography;
   copyright violations;
   trademark violations;
   solicitations for sexual services;
   advertisements for drags; and
   advertisements for counterfeit goods.

16. The computer-implemented method of claim 1, wherein a first set of multiple first dictionaries and a second dictionary is used for identifying at least one word in a first field of a first member profile as being allowed, while the one word in a second field of the first member profile is identified by a second set of multiple first dictionaries as being disallowed.

17. The computer-implemented method of claim 1, further comprising creating the set of multiple first dictionaries by:
   categorizing words into each dictionary based on predetermined percentages of occurrences of words in disallowed profiles and a minimum number of instances, wherein the words are taken from a training set comprising member profiles that have been determined to be disallowed profiles.

18. The non-transitory computer-readable storage medium of claim 6, wherein a first set of multiple first dictionaries and a second dictionary is used for identifying at least one word in a first field of a first member profile as being allowed, while the one word in a second field of the first member profile is identified by a second set of multiple first dictionaries as being disallowed.

19. The non-transitory computer-readable storage medium of claim 6, further comprising creating the set of multiple first dictionaries by:
   categorizing words into each dictionary based on predetermined percentages of occurrences of words in disallowed profiles and a minimum number of instances, wherein the words are taken from a training set comprising member profiles that have been determined to be disallowed profiles.

20. The system of claim 11, wherein a first set of multiple first dictionaries and a second dictionary is used for identifying at least one word in a first field of a first member profile as being allowed, while the one word in a second field of the first member profile is identified by a second set of multiple first dictionaries as being disallowed.

21. The system of claim 11, further comprising creating the set of multiple first dictionaries by:
   categorizing words into each dictionary based on predetermined percentages of occurrences of words in disallowed profiles and a minimum number of instances, wherein the words are taken from a training set comprising member profiles that have been determined to be disallowed profiles.

* * * * *